United States Patent [19]

Bottomley et al.

[11] 4,132,645
[45] Jan. 2, 1979

[54] TWO-STAGE OIL SKIMMER SEPARATOR

[75] Inventors: James C. Bottomley, Sapulpa; Henry G. Nash, Tulsa, both of Okla.

[73] Assignee: Sun Oil Company of Pennsylvania, Philadelphia, Pa.

[21] Appl. No.: 816,109

[22] Filed: Jul. 15, 1977

[51] Int. Cl.² ........................................... B01D 21/10
[52] U.S. Cl. .................... 210/104; 210/187; 210/320; 210/522; 210/540
[58] Field of Search ............... 210/100, 104, 124, 126, 210/187, 195, 522, 533, 537, 540, 119, 320

[56] References Cited

U.S. PATENT DOCUMENTS

| 2,771,997 | 11/1956 | Unthank | 210/540 |
| 3,040,499 | 6/1962 | May | 210/124 X |
| 3,925,204 | 12/1975 | Cheysson et al. | 210/187 |
| 3,971,719 | 7/1976 | Peters | 210/540 |
| 3,992,297 | 11/1976 | Baughcam et al. | 210/540 |

Primary Examiner—Theodore A. Granger

Attorney, Agent, or Firm—J. Edward Hess; Donald R. Johnson; Paul Lipsitz

[57] ABSTRACT

A two stage oil skimmer separator for separating a hydrocarbon, such as oil or wax, from the water in a hydrocarbon-water mixture which is of particular utility for the output from an oil refinery storm sewer system. The first stage of the separator includes a tank which allows gravity separation of the hydrocarbon and water. The floating hydrocarbon is skimmed off the top and directed to the second stage separator. The settled water passes under a baffle to retain the hydrocarbon within the system while passing the water out of the separator. The skimmed hydrocarbon, containing some water, is directed to the second stage where it is heated to facilitate further separation. The hydrocarbon is passed from the top of the second stage to storage tanks in the refinery. The water in the bottom of the second stage tank is returned to the first stage for further separation.

6 Claims, 4 Drawing Figures

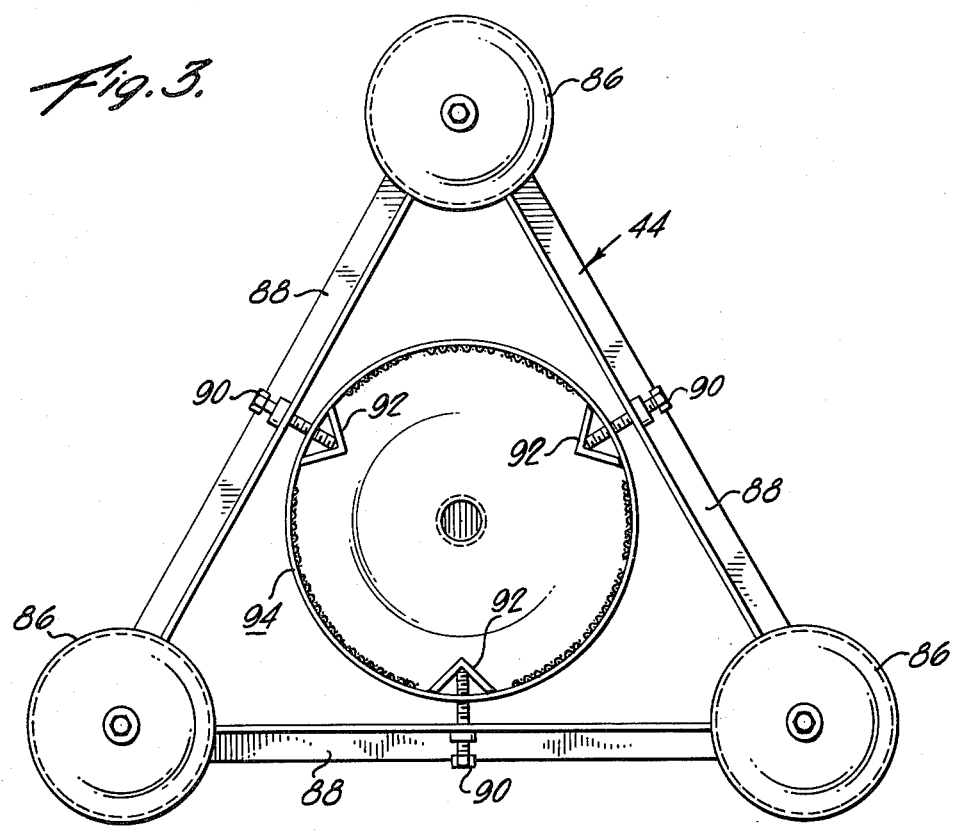
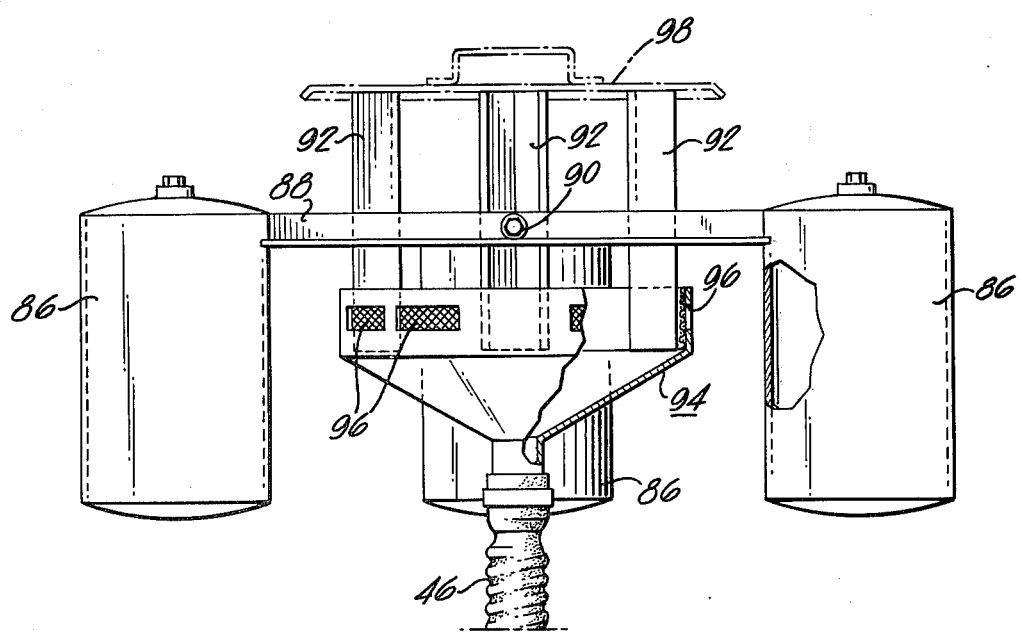

TWO-STAGE OIL SKIMMER SEPARATOR

BACKGROUND OF THE INVENTION

The present invention relates generally to an oil-water separator, and more particularly relates to an oil-water separator adapted to be used on the output of an oil refinery storm sewer system. The term oil as used in this disclosure is meant to include oils, waxes and other hydrocarbon materials commonly found in refinery operations.

Existing oil-water separators have utilized a one-stage design in which oil is skimmed off of the top of the oil-water mixture. The skimming may be done by a pump and a doughnut floater or a floater having a variable baffle design. These systems are designed to separate the oil in a one-stage operation, but unfortunately the oil product output contains a substantial amount of water.

BRIEF DESCRIPTION OF THE DRAWINGS

FIGS. 3 and 4 illustrate respectively top and side views of the oil skimmer utilized in the separator.

DETAILED DESCRIPTION OF THE EMBODIMENT

Figure 1:
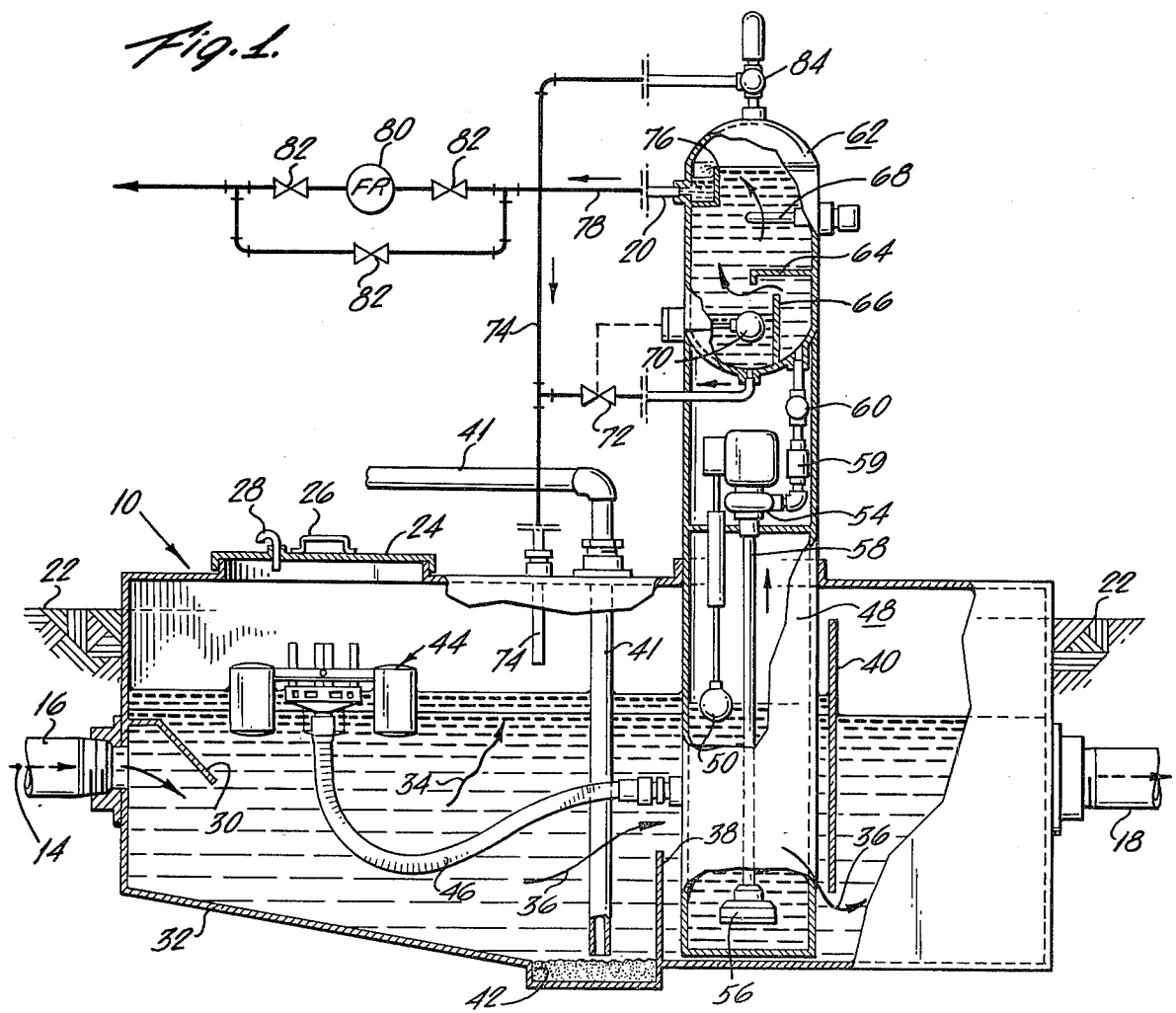
FIG. 1 illustrates a side elevation partially in section of one embodiment of the two-stage separator of this invention.

FIG. 1 illustrates a side elevation view partly in perspective of one embodiment of the two-stage oil separator of this invention. An oil refinery storm sewer system provides a stream 14 in a sewer pipe 16 which provides the input of an oil-water mixture into the two-stage separator shown generally as 10. The mixture is processed by two stages of the separator, and produces a water output through a sewer pipe 18 and an oil output through a pipe 20 back to a storage tank in the oil refinery.

In the illustrated embodiment, the separator is adapted to be mostly buried underground, with the ground level rising to approximately line 22. A manway 24 is provided to allow access to the interior of the separator. The manway cover has a handle 26 to lift it off the separator, and further has a vent 26 protruding through it to vent the separator.

Figure 2:
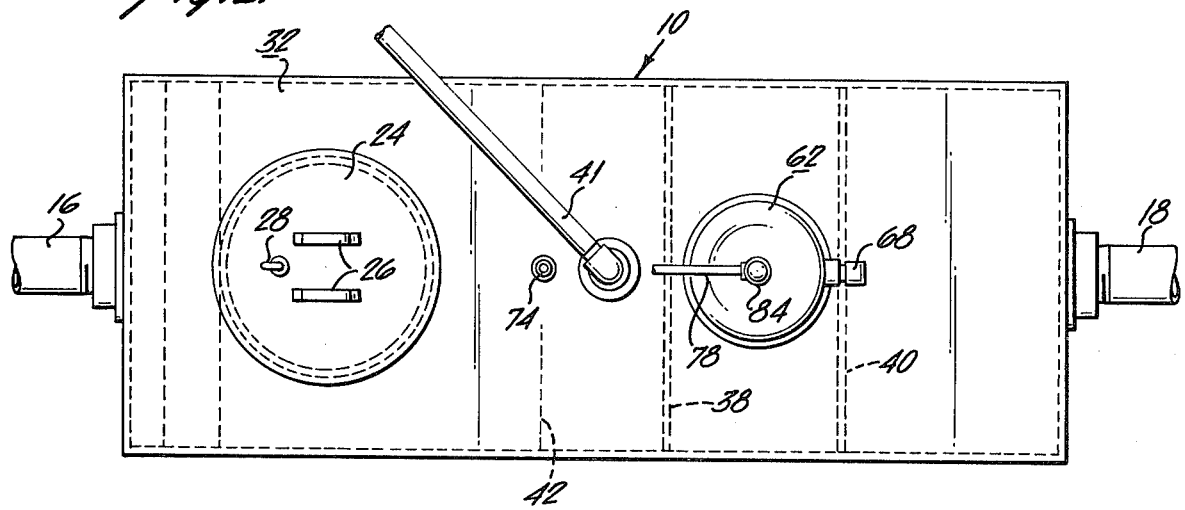
FIG. 2 is a top plan view of the system of FIG. 1.

Referring to FIGS. 1 and 2, there is illustrated respectively, a plan view and a cut-away view of the two stage separator. The water/oil mixture 14 enters through sewer pipe 16 and immediately encounters an inlet baffle 30 which deflects the mixture down into the mixture already held within the skim basin 32 defined by the outer shell of the separator. The outer shell may be formed of steel or alternatively may be formed of concrete or some other suitable material. The oil being lighter than the water, rises as illustrated by arrow 34 while the flow of water, which is the heavier component of the mixture, is illustrated by arrows 36. Thus gravity provides the means for the separation of the water from the oil. As illustrated, the water flows first over a baffle 38 which is provided across the full width of the skim basin to trap any dirt and heavy sediment in the water and to prevent it from flowing through and out of the separator. The water then flows under a second baffle 40, which also extends across the full width of the separator, and which is provided to retain the surface oil mixture to the left of the baffle. The liquid to the right of baffle 40 will be substantially all water, and the water level to the right of baffle will vary in accordance with the flow of the sewer stream into the separator. A pipe 41 is provided which extends from above the surface of the separator down into a dirt pit 42 which is provided immediately to the left of baffle 38. The pipe 41 allows the periodic cleaning of accumulated dirt in the pit by periodically attaching a pump to the pipe 41 and sucking the residue from the pit. The oil which floats to the surface of the liquid is skimmed by a skimmer 44, the details of which are illustrated in FIGS. 3 and 4. The skimmed oil is directed by a flexible hose 46 into an oil tank 48 which extends above the skim basin as shown. The oil tank 48 occupies only a portion of the width of the skim basin to allow the water to flow around it as illustrated. The level of skimmed oil in the tank 48 is controlled by a float 50. As the level of oil in the tank increases, the float 50 rises and actuates a level control switch thereby starting an electrical pump 54 which pumps the skimmed oil through a filter 56, pipe 58, a oneway valve 59 and a second valve 60 into a tank 62 wherein the second stage of oil-water separation occurs. The tank 62 has an inlet baffle 64, similar to inlet baffle 30, and a water retaining baffle 66. A heater 68 heats the mixture within the tank 62 to cause additional oil-water separation. As the level of water within the tank rises, interface float 70 actuates a level control valve 72 to drain the additional water from the upper tank 62 and back to the lower tank through a return pipe 74 for reprocessing through the first stage. As the oil within the top tank 62 fills up the tank it flows over an outlet baffle 76 and into an oil outlet pipe 78, and then through a flow recorder 80 to a storage tank within the refinery. Valves 82 are provided to control the flow of the oil either through or around the flow recorder 80. A relief valve 84 is provided in the event of some malfunction within the system. The relief valve would deliver the fluid through line 74 and back into the first stage of the separator.

FIGS. 3 and 4 illustrate respectively top and side views of the skimmer 44. As shown the skimmer has three hollow cylindrical floats 86 to support it on the surface of the water. L-shaped struts 88 extend between the floats to form a triangular shaped mechanism, as shown in FIG. 3. Each strut includes a threaded hole in it to support an adjusting screw 90, which bears against three vertically positioned adjusting members 92. The adjusting members support at variable heights depending upon the position of the vertical adjusting members 92 relative to the adjusting screws 90 a funnel shaped member 94 which has a plurality of apertures with screens therein 96 around its circumference to allow the skimmed oil to flow through the screened apertures and then into the hose 46. FIG. 4 illustrates an optional rain shield 98 which would be provided in those embodiments wherein the skim basin 32 had an open top.

The height of the skimmer 94 relative to the float 86 is set such that the floating oil will flow through the apertures 96 into the skimmer 94 and then into hose 46.

The disclosed embodiment provides a two-phase separator which will be fully automatic, requiring only periodic maintenance. The system is of particular value for use in refineries where oil-water mixtures are found in sewer pipe and has further desirable value as a means to remove wax wastes and similar materials from sewer lines where they tend to plug the lines.

Numerous variations to the above described system may be made by the skilled art worker without departing from the scope of the invention.

The invention claimed is:

1. A two-stage oil-water separator comprising:
   (a) a first stage separator defining a tank structure providing an inlet for the oil-water mixture, an exit for separated water, which provides for gravity separation of the oil water mixture;
   (b) a skimmer means floating on liquid in said tank for skimming the oil off of the top of the liquid surface;
   (c) baffle means submerged in said tank which retains oil in said tank but allows water to flow out of said tank;
   (d) a chamber located within said tank and extending upwardly therefrom receiving in a bottom portion of said chamber by gravity flow said skimmed oil from said skimmer means, said chamber including a pump activated by a float switch to pump accumulated oil to a second stage separator within said chamber for further separation of oil and water, a heater means within said second stage separator for providing further separation of water from the oil skimmed from the top of said first stage; said second stage separator having means for removing oil from the top thereof and means for withdrawing water which has settled to the bottom thereof and returning said water back to the first stage separator.

2. A system as set forth in claim 1 wherein the water withdrawing means in said second stage separator is activated by a float positioned at the interface of oil and water in said second stage separator.

3. A system as set forth in claim 1 wherein said second stage separator is positioned above said first stage separator and includes pumping means, responsive to the level of skimmed oil in said first stage separator for pumping the skimmed product into said second stage separator.

4. A system as set forth in claim 1 wherein said baffle means for separating the water from the bottom of said first stage separator extends from above the level of the oil-water mixture down to a predetermined depth above the bottom of said tank so that the heavier water passes under said baffle means and is removed from said separator, but said baffle means retains the lighter oil within said separator.

5. A system as set forth in claim 4 and including a dirt collecting means at the bottom of said tank for retaining dirt and particulate matter which enters said first stage separator.

6. A system as set forth in claim 1 wherein the inlet to said separator is coupled to an oil refinery storm sewer and provides for separation of the oil-water product collected by the refinery storm sewer.

* * * * *